(12) United States Patent
Sharma

(10) Patent No.: US 11,230,234 B1
(45) Date of Patent: Jan. 25, 2022

(54) COMPLIANT CAMERA MOUNTING

(71) Applicant: Waymo LLC, Mountain View, CA (US)

(72) Inventor: Shashank Sharma, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/877,446

(22) Filed: May 18, 2020

(51) Int. Cl.
*B60R 11/04* (2006.01)
*H04N 5/225* (2006.01)
*H04N 5/232* (2006.01)
*B60R 11/00* (2006.01)

(52) U.S. Cl.
CPC ........... *B60R 11/04* (2013.01); *H04N 5/2252* (2013.01); *H04N 5/2254* (2013.01); *H04N 5/2257* (2013.01); *H04N 5/23248* (2013.01); *B60R 2011/0052* (2013.01)

(58) Field of Classification Search
None
See application file for complete search history.

(56) References Cited

U.S. PATENT DOCUMENTS

| 9,225,902 B1 | 12/2015 | Mohr |
| 10,480,612 B2 | 11/2019 | Liu et al. |
| 2012/0327230 A1* | 12/2012 | Ellison ................. H04N 5/2252 348/148 |
| 2015/0274091 A1* | 10/2015 | Lang ....................... B60R 21/01 348/148 |

(Continued)

FOREIGN PATENT DOCUMENTS

| CN | 201892003 U | 7/2011 |
| CN | 103968216 B | 4/2016 |

(Continued)

OTHER PUBLICATIONS

Vibration Reduction and Control for Traffic Cameras Technical Report, Abolmaali et al., published Oct. 31, 2017, available via the Internet at https://library.ctr.utexas.edu/hostedpdfs/uta_0-5251-2.pdf, 15 pages.

*Primary Examiner* — Rebecca A Volentine
(74) *Attorney, Agent, or Firm* — McDonnell Boehnen Hulbert & Berghoff LLP

(57) ABSTRACT

The present disclosure relates to systems and methods for attenuating vibrations. An example system includes a camera device with an optical lens. The optical lens defines an optical axis. The example system further includes mechanical fasteners, each mechanical fastener having a first end, a second end coupled to a mounting surface of the vehicle, and a shaft. The shaft has a primary axis parallel to the optical axis and extends through the camera device such that the camera device is able to move through a primary range of motion in a direction along the primary axis and a restricted range of motion in directions perpendicular to the primary axis. The example system additionally includes compliant structures coupled to the camera device, each compliant structure associated with a respective mechanical fastener and configured to change shape in response to motion of the camera device along the primary axis.

9 Claims, 16 Drawing Sheets

(56) References Cited

U.S. PATENT DOCUMENTS

| | | | |
|---|---|---|---|
| 2016/0112607 A1* | 4/2016 | Yang | H04N 5/2253 |
| | | | 348/373 |
| 2016/0191863 A1 | 6/2016 | Minikey, Jr. et al. | |
| 2019/0003518 A1* | 1/2019 | Kolvek | H04N 5/2254 |
| 2019/0017570 A1* | 1/2019 | Tomomasa | G03B 17/561 |
| 2019/0168686 A1 | 6/2019 | Haidong et al. | |
| 2020/0401020 A1* | 12/2020 | Masuda | H05K 7/14 |

FOREIGN PATENT DOCUMENTS

| | | |
|---|---|---|
| CN | 206086571 U | 4/2017 |
| CN | 207565853 U | 7/2018 |
| CN | 207631146 U | 7/2018 |
| CN | 108545029 A | 9/2018 |
| CN | 208715113 U | 4/2019 |
| CN | 209743982 U | 12/2019 |
| DE | 102013001721 | 8/2014 |
| JP | 2014015191 A | 1/2014 |
| KR | 101921625 B1 | 11/2018 |

\* cited by examiner

COMPLIANT CAMERA MOUNTING

BACKGROUND

Autonomous vehicles or vehicles operating in an autonomous mode may use various cameras to detect their surroundings. For example, an autonomous vehicle could include a front facing camera, a rear facing camera, and two side facing cameras. The autonomous vehicle could use such cameras for object detection and avoidance and/or in navigation, for example.

SUMMARY

In a first aspect, a system is provided. The system includes a camera device. The camera device is configured to capture images of an environment of a vehicle and includes a body and an optical lens. The optical lens defines an optical axis of the camera device. The system further includes a mounting surface of the vehicle. The system yet further includes a plurality of mechanical fasteners, each mechanical fastener having a first end, a second end coupled to the mounting surface of the vehicle, and a shaft that connects the first end to the second end. The shaft for each mechanical fastener has a primary axis parallel to the optical axis of the camera device. Further, the shaft for each mechanical fastener extends through an opening of the body of the camera device such that the body of the camera device is able to move through a primary range of motion in a direction along the primary axis and a restricted range of motion in directions perpendicular to the primary axis, where the primary range of motion is greater than the restricted range of motion. The system additionally includes a plurality of compliant structures mechanically coupled to the body of the camera device. Each of the compliant structures is associated with a respective mechanical fastener and is configured to change shape in response to motion of the body of the camera device along the primary axis of the respective mechanical fastener.

In a second aspect, a method is provided. The method includes mechanically coupling a plurality of compliant structures to a body of a camera device. The camera device is configured to capture images of an environment of a vehicle. The camera device includes an optical lens that defines an optical axis of the camera device. The method further includes attaching the camera device to a mounting surface of a vehicle by way of a plurality of mechanical fasteners. Each of the plurality of mechanical fasteners has a first end, a second end coupled to the mounting surface of the vehicle, and a shaft that connects the first end to the second end. The shaft for each mechanical fastener has a primary axis parallel to the optical axis of the camera device. Further, the shaft for each mechanical fastener extends through an opening of the body of the camera device such that the body of the camera device is able to move through a primary range of motion in a direction along the primary axis and a restricted range of motion in directions perpendicular to the primary axis, where the primary range of motion is greater than the restricted range of motion. In addition, each of the plurality of compliant structures is associated with a respective mechanical fastener and is configured to change shape in response to motion of the body of the camera device along the primary axis of the respective mechanical fastener.

In a third aspect, a method is provided. The method includes receiving, at a mounting surface of a vehicle, vibrations experienced by the vehicle. The mounting surface of the vehicle is attached to a body of a camera device by way of a plurality of mechanical fasteners. Each of the plurality of mechanical fasteners has a first end, a second end coupled to the mounting surface of the vehicle, and a shaft that connects the first end to the second end. The shaft for each mechanical fastener has a primary axis parallel to an optical axis of the camera device. Further, the shaft for each mechanical fastener extends through an opening of the body of the camera device such that the body of the camera device is able to move through a primary range of motion in a direction along the primary axis and a restricted range of motion in directions perpendicular to the primary axis, where the primary range of motion is greater than the restricted range of motion. The method further includes transferring, from the mounting surface of the vehicle to the camera device, the vibrations experienced by the vehicle. In the method, a plurality of compliant structures are mechanically coupled to the body of the camera device, each compliant structure associated with a respective mechanical fastener and configured to change shape in response to motion of the body of the camera device along the primary axis of the respective mechanical fastener. The method yet further includes attenuating, by way of the plurality of compliant structures, the vibrations experienced by the vehicle such that vibrations experienced by the camera device have a lesser magnitude than the vibrations experienced by the vehicle.

Other aspects, embodiments, and implementations will become apparent to those of ordinary skill in the art by reading the following detailed description, with reference where appropriate to the accompanying drawings.

DETAILED DESCRIPTION

Figure 1:
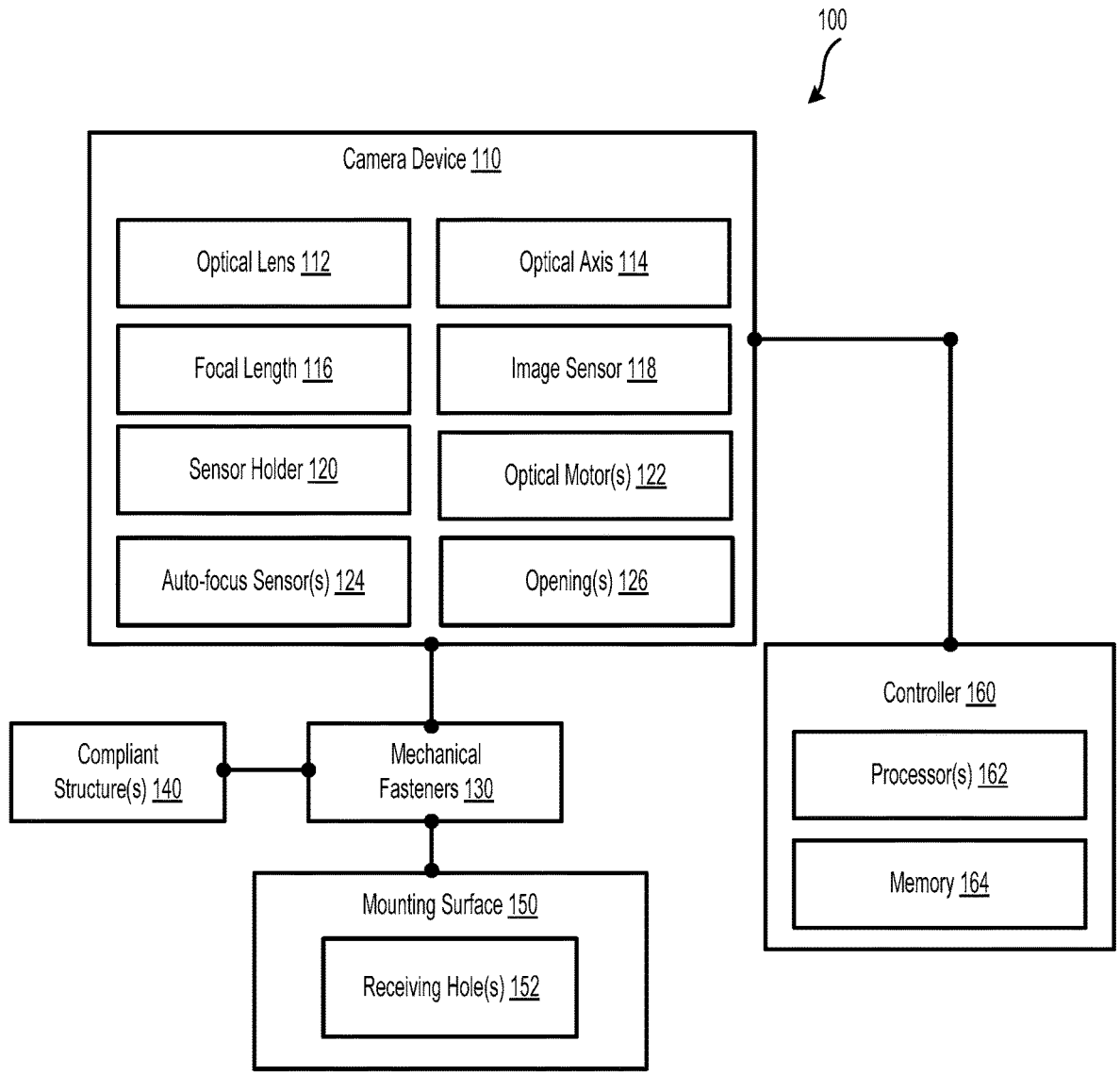
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Sometimes, an autonomous vehicle may want to adjust the configuration of its cameras. For example, if a camera becomes out of focus because of temperature changes or other aberrant disturbances, then the autonomous vehicle may want to adjust the focus of that camera. As another example, if a camera fails to detect a distant object, then the autonomous vehicle may want to adjust the zoom of that camera. Other types of adjustments are also possible.

To facilitate such adjustments, each camera attached to an autonomous vehicle may contain an optical motor that electronically controls movement of the camera's optical lens. The autonomous vehicle could communicate with these optical motors to adjust the configuration of its cameras. For example, to adjust the zoom of a camera, an autonomous vehicle could instruct the camera's optical motors to move an optical lens either towards or away from an image sensor of the camera.

However, moving the position of a camera's optical lens can be complex task. In particular, when an autonomous vehicle experiences vibrations, for instance from an unsmooth road, the autonomous vehicle may transfer some of those vibrations to its attached cameras. And in turn, those vibrations could interfere with the optical motors of the attached cameras, for example, by causing an optical motor to incorrectly move the position of a camera's optical lens, among other possibilities.

One approach to address this problem is to place general purpose vibration dampeners, such as rubber mounts or bobbin mounts, between the cameras of an autonomous vehicle and the body of the autonomous vehicle. Such dampeners generally dissipate vibration energy by oscillating in various directions. But this oscillation can also cause the cameras to slightly wobble, which can slightly shift the pointing directions of the cameras. Because small shifts to a camera's pointing direction could cause severe perception issues for the autonomous vehicle, using general purpose vibration dampeners becomes impractical.

Disclosed herein is a system to help address this technical problem.

In accordance with the disclosure, a system could include a camera device that has a body and an optical lens. The optical lens could be configured to capture images from an environment of a vehicle and could define an optical axis of the camera device. The system could further include a mounting surface of the vehicle and a plurality of mechanical fasteners. Each of the mechanical fasteners could have a first end, a second end that is coupled to the mounting surface of the vehicle, and a shaft that connects the first end to the second end. The shaft could have a primary axis that is parallel to the optical axis of the camera device. Further, the shaft could extend through an opening of the body of the camera device such that the body of the camera device is able to move through a primary range of motion in a direction along the primary axis and move through a restricted range of motion in directions perpendicular to the primary axis, where the primary range of motion is greater than the restricted range of motion.

The system could further include a plurality of compliant structures mechanically coupled to the body of the camera device. Each of these compliant structures could be associated with a respective mechanical fastener and could be configured to change shape in response to motion of the body of the camera device along the primary axis of the respective mechanical fastener. The compliant structures could be designed to attenuate vibrations transferred from the mounting surface of the vehicle to the camera device such that vibrations experienced by the camera device have a lesser magnitude than vibrations experienced by the mounting surface of the vehicle.

In line with the discussion above, a vehicle could use the described system to reduce the vibration experienced by its camera devices. For example, a vehicle could contain a mounting surface and could utilize the described mechanical fasteners to attach several camera devices to its mounting surface. Because of the system's design, the attached camera devices could oscillate with respect to the optical axis, thereby dissipating vibration experienced by the camera devices' optical motors, but may have restricted movement in all other directions, thereby reducing or preventing shifts to the camera devices' pointing directions.

II. Example Optical Systems

FIG. 1 illustrates a system 100, according to an example embodiment. The system includes a camera device 110. The camera device 110 includes an optical lens 112, which defines an optical axis 114 and a focal length 116. The optical lens 112 could include one or more plano-convex lenses, a prism lens, a cylindrical lens, a conical lens, and/or other type of lens. In some embodiments, the camera device 110 could include a plurality of optical lenses.

The camera device 110 additionally includes an image sensor 118. The image sensor 118 could include a focal plane array or another type of multi-element photodetector sensor. For example, the image sensor 118 could include a plurality of charge-coupled device (CCD) elements and/or a plurality of complementary metal-oxide-semiconductor (CMOS) elements. In some embodiments, the camera device 110 could include a plurality of image sensors. In an example embodiment, the image sensor 118 could be configured to detect light in the infrared spectrum (e.g., about 700 nanometers to about 1000 nanometers) and/or within the visible spectrum (e.g., about 400 nanometers to about 700 nanometers). Other spectral ranges are possible and contemplated herein.

The image sensor 118 could be configured (e.g., sized or dimensioned) according to an image sensor format. For example, the image sensor 118 could include a 16 millimeter format (e.g., 16 millimeter diagonal format and/or a one-inch video camera tube equivalent) or a full-frame (e.g., 35 millimeter) format sensor. Additionally or alternatively, the image sensor 118 could include "crop sensor" formats, such as APS-C (e.g., 28.4 mm diagonal) or one inch (e.g., 15.86 mm diagonal) formats. Other image sensor formats are contemplated and are possible within the scope of the present disclosure.

In some embodiments, the image sensor 118 could include an alumina (e.g., $Al_2O_3$) package or another type of semiconductor device packaging material.

The camera device 110 yet further includes a sensor holder 120. In some embodiments, the sensor holder 120 could position the image sensor 118 along the optical axis 114. In some embodiments, the sensor holder 120 could be formed from aluminum, steel, ceramic, carbon fiber, composite materials, or another type of rigid material. The sensor holder 120 could have a flat plate-like shape and could include an opening to provide physical and optical access for the image sensor 118. In an example embodiment, the sensor holder 120 could include a rectangular or square plate of material with a rectangular or square opening for access to the image sensor 118. In an example embodiment, the sensor holder 120 could be between 2 millimeters and 5 millimeters thick, although other thicknesses and dimensions of the sensor holder 120 are contemplated. In some examples, the sensor holder 120 could be formed from and/or coated with a material and/or surface having a low reflectivity in the operating wavelength range of the camera device 110. As an example, the sensor holder 120 could be coated with an anti-reflective material (e.g., a light-absorbing material or an optical interference layer) configured to attenuate light reflections at least in the visible and/or infrared wavelength range.

In various examples, the focal length 116 could be a dynamic focal length. That is, the focal length 116 could be substantially variant during the operation of the camera device 110. In such scenarios, the camera device 110 could be an adjustable-focal length device (e.g., a camera device that includes an adjustable-focus mechanism). For example, the camera device 110 could use one or more optical motors 122 to adjust the focal distance 116 by changing the position of the optical lens 112 with respect to the image sensor 118. In some embodiments, the operations of the optical motor(s) 122 can be triggered by controller 160. In other embodiments, the camera device 110 could use one or more auto-focus sensor(s) 124 to trigger the operations of the optical motor(s) 122.

In an example embodiment, the camera device 110 could be coupled to mounting surface 150 by way of mechanical fasteners 130. In such scenarios, the camera device 110 could include one or more opening(s) 126 and the mounting surface 150 could include one or more receiving holes 152. The mechanical fasteners 130 could extend through the opening(s) 126 in the camera device 110 and into corresponding receiving hole(s) 152 in mounting surface 150. Opening(s) 126 could be positioned at distal regions of the camera device 110 or could be positioned near the centermost region of the camera device 110, among other possibilities. Further, the mounting surface 150 could be part of a vehicle (e.g., part of the frame of a vehicle) or could be an external mount mechanically attached to a vehicle.

The mechanical fasteners 130 could include, for example, bolts, such as shoulder bolts, carriage bolts, plow bolts, and/or barrel bolts, rivets, such as tubular rivets, friction rivets, and/or split rivets, screws, and/or other types of fasteners. In some embodiments, the mechanical fasteners 130 have threads and could attach to the mounting surface 150 by way of those threads. In other embodiments, the mechanical fasteners 130 could attach to the mounting surface 150 by other means, such as a clamp. The mechanical fasteners 130 could be formed of aluminum, steel, or another type of structural material.

The number of mechanical fasteners 130 could vary. In some embodiments, the number of mechanical fasteners is two. In other embodiments, the number of mechanical fasteners is four. Other numbers are also possible.

In example embodiments, each of the mechanical fasteners 130 could be associated with at least one of compliant structure(s) 140. Each of the compliant structure(s) 140 may be mechanically coupled to the camera device 110 and may be configured to change shape in response to motion of the camera device 110 along a primary axis of the mechanical fasteners 130. In this way, the compliant structure(s) 140 could attenuate vibrations transferred from the mounting surface 150 to the camera device 110.

The compliant structure(s) 140 could take the form of various materials. For example, the compliant structure(s) 140 could take the form of O-rings, metal springs, and/or Belleville washers, among other possibilities. In some embodiments, the stiffness of each of the compliant structure(s) 140 may be based, at least in part, on the length of the mechanical fasteners 130.

In some embodiments, at least one of the compliant structure(s) 140 is positioned between the camera device 110 and the mounting surface 150. In such embodiments, movement of the camera device 110 toward the mounting surface 150 compresses the at least one compliant structure and movement of the camera device 110 away from the mounting surface 150 decompresses the at least one compliant structure.

In some examples, the system 100 also includes a controller 160. The controller 160 could include at least one of a field-programmable gate array (FPGA) or an application-specific integrated circuit (ASIC). Additionally or alternatively, the controller 160 may include one or more processors 162 and a memory 164. The one or more processors 162 may include a general-purpose processor or a special-purpose processor (e.g., digital signal processors, etc.). The one or more processors 162 may be configured to execute computer-readable program instructions that are stored in the memory 164.

The memory 164 may include or may take the form of one or more computer-readable storage media that may be read or accessed by the one or more processors 162. The one or more computer-readable storage media can include volatile and/or non-volatile storage components, such as optical, magnetic, organic or other memory or disc storage, which may be integrated in whole or in part with at least one of the one or more processors 162. In some embodiments, the memory 164 may be implemented using a single physical device (e.g., one optical, magnetic, organic or other memory or disc storage unit), while in other embodiments, the memory 164 can be implemented using two or more physical devices.

As noted, the memory 164 may include computer-readable program instructions that relate to operations of system 100. As such, the memory 164 may include program instructions to perform or facilitate some or all of the functionality described herein. In some embodiments, controller 150 may carry out various operations by way of the processor 162 executing instructions stored in the memory 164.

For example, the controller 160 may be part of or communicatively coupled to a vehicle, such as vehicle 400 described below, and may be configured to control aspects of camera device 110 on behalf of the vehicle. For instance, the controller 160 may instruct the camera device 110 to capture the one or more images according to one or more image capture properties. The image capture properties could include a desired aperture, desired exposure time, and/or a desired image sensor light sensitivity (e.g., ISO), among other possibilities. As another example, the controller 160 may instruct the camera device 110 to adjust the focal length 116 according to one or more configuration properties. The configuration properties could include a desired focal distance, a desired magnification, and/or a desired angle of view, among other possibilities.

Further, the controller 160 could be configured to carry out other operations relating to the capture of images using the camera device 110. In some examples, the camera device 110 could optionally include one or more illumination devices (e.g., light-emitting diodes). In such examples, the controller 160 could coordinate the operation of the illumination devices so as to properly illuminate a scene before and/or during image capture by the image sensor 118.

In some examples, elements of system 100 could be selected and/or utilized to achieve passive athermalization of the system 100. For example, materials of system 100 could be selected so as to reduce the temperature and stress-related movement of certain parts (e.g., image sensor 118) with respect to others (e.g., optical lens(es) 112) as described in the present disclosure. In particular, the various material coefficients of thermal expansion (CTEs) could be taken into account when designing system 100. Additionally or alternatively, a low CTE solder (e.g., indium wire, indium preforms, low CTE molds, etc.) could be utilized to couple two or more elements of system 100 to one another.

Figure 2A:
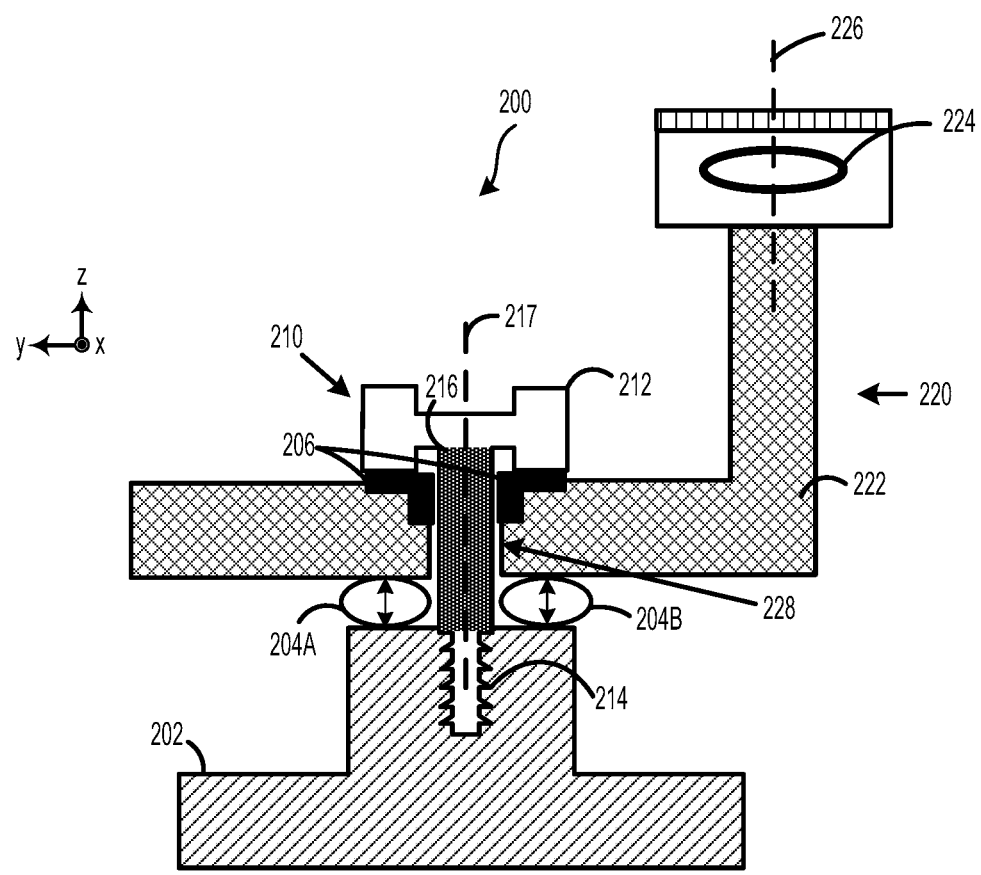
FIG. 2A illustrates an example arrangement a system, according to an example embodiment.

FIG. 2A illustrates an arrangement of a system 200, according to an example embodiment. System 200 can include some or all of the functions described in connection with system 100 in reference to FIG. 1. As illustrated, the system 200 includes a mounting surface 202, a mechanical fastener 210, and a camera device 220. The mechanical fastener 210 couples the camera device 220 to the mounting surface 202.

Mechanical fastener 210 includes a first end 212, a second end 214, and a shaft 216 that connects the first end 212 to the second end 214. In some embodiments, first end 212 includes a plugging element that has a width greater than the width of the shaft 216. The plugging element could thus prevent the camera device 220 from moving beyond the first end 212 (e.g., keeps movement of the camera device 220 between first end 212 and second end 214). Second end 214 is coupled to the mounting surface 202. The connection between the second end 214 and the mounting surface 202 is illustrated in FIG. 2A as a threaded connection, however as discussed above, other types of connections between the second end 214 and the mounting surface 202 are also possible.

Camera device 220 includes a body 222 and an optical lens 224. Optical lens 224 defines an optical axis 226, which in FIG. 2A is illustrated as being parallel to the z-axis. Body 222 includes an opening 228 therethrough. In some embodiments, the opening 228 in body 222 has a width in a range from 7 mm to 25 mm. In other embodiments, the opening 228 in body 222 has a width that is slightly (e.g., within 1 mm) less than the width of shaft 216.

As shown in FIG. 2A, the primary axis 217 of shaft 216 is parallel to the optical axis 226 of optical lens 224. Put differently, both the primary axis 217 of shaft 216 and the optical axis 226 are parallel to the z-axis. As used herein, a primary axis of an element refers the axis that encompasses the longest dimension of that element. For example, the longest dimension of shaft 216 is along the z-axis, and thus the primary axis 217 of shaft 216 is along the z-axis.

In example embodiments, shaft 216 of mechanical fastener 210 extends through opening 228 in body 222. By doing so, shaft 216 causes the body 222 to move through a primary range of motion in a direction along the primary axis 217 (e.g., along the z-axis) of shaft 216 and a restricted range of motion in directions perpendicular (e.g., along the y-axis and x-axis) to the primary axis 217 of shaft 216. As used herein, a range of motion refers a maximum distance that an element can move from its present position.

In line with the discussion above, the primary range of motion could be greater than the restricted range of motion. For example, the body 222 of the camera device 220 could have a primary range of motion of 2 mm and a restricted range of motion of 0.1 mm. Other values for the primary range of motion and the restricted range motion are also possible and contemplated herein. As noted above, the restricted range motion along the y-axis and the x-axis could reduce large shifts to the pointing direction of the camera device 220.

In the arrangement illustrated in FIG. 2A, compliant structures 204A and 204B are positioned between the body 222 of the camera device 220 and the mounting surface 202. As discussed above, such compliant structures could attenuate vibration transferred from the mounting surface 210 to the camera device 220 such that vibrations experienced by the camera device 220 have a lesser magnitude than vibrations experienced by the mounting surface 210. For example, upon receiving a vibration from mounting surface 210, the body 222 of camera device 220 could oscillate with respect to the primary axis 217 of shaft 216. Such oscillation could compress the compliant structures 204A and 204B when body 222 oscillates and/or moves toward mounting surface 202 and could decompress the compliant structures 204A and 204B when body 222 oscillates and/or moves away from mounting surface 202. The repeated compression and decompression of compliant structures 204A and 204B by the body 222 could thereby cause energy dissipation of the vibration experienced by mounting surface 202.

System 200 also includes a bushing 206 that surrounds the opening 228 in body 222. Bushing 206 could further help to reduce vibrations experienced by the camera device 220 and could enable smooth movement of the body 222 along the primary axis 217 of shaft 216.

Figure 2B:
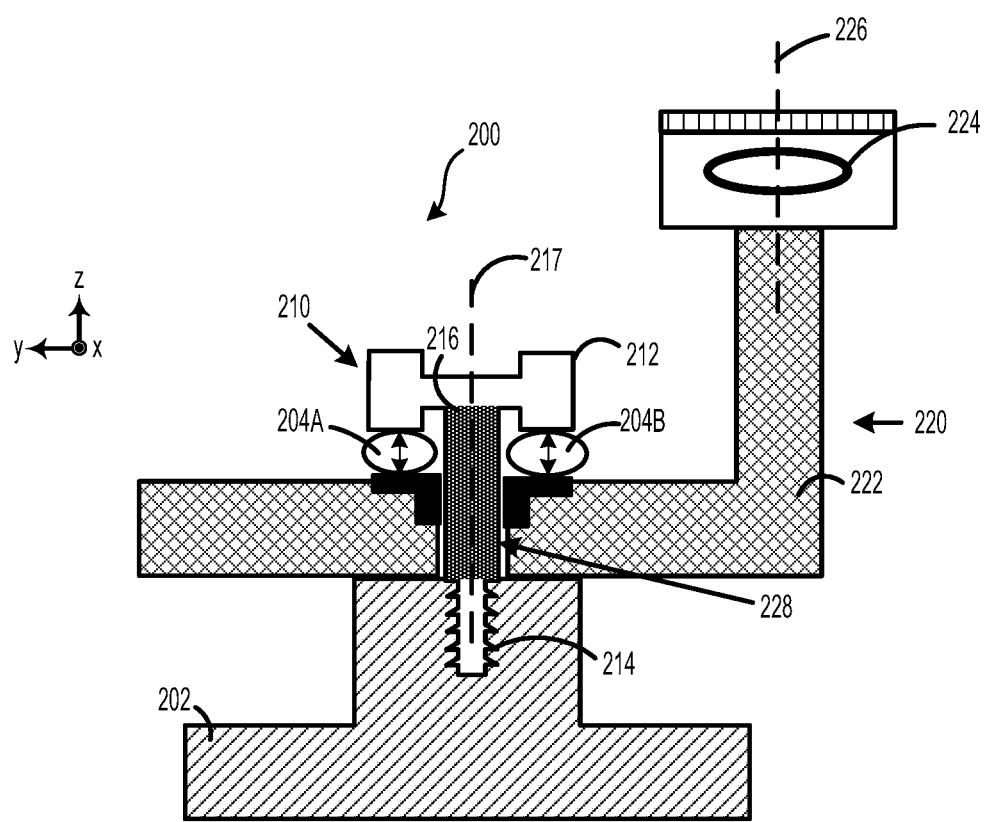
FIG. 2B illustrates an alternative arrangement of the system of FIG. 2A, according to an example embodiment.

FIG. 2B illustrates an alternative arrangement for the system 200 illustrated in FIG. 2A, according to an example embodiment. In particular, FIG. 2B illustrates alternative positions for compliant structures 204A and 204B, which now are located between the first end 212 of mechanical fastener 210 and the body 222 of the camera device 220. In the arrangement depicted in FIG. 2B, movement of the body 222 of the camera device 220 away from the mounting surface 202 could compress the compliant structures 204A and 204B, while movement of the body 222 of the camera device 220 toward the mounting surface 202 could decompress the compliant structures 204A and 204B.

Figure 2C:
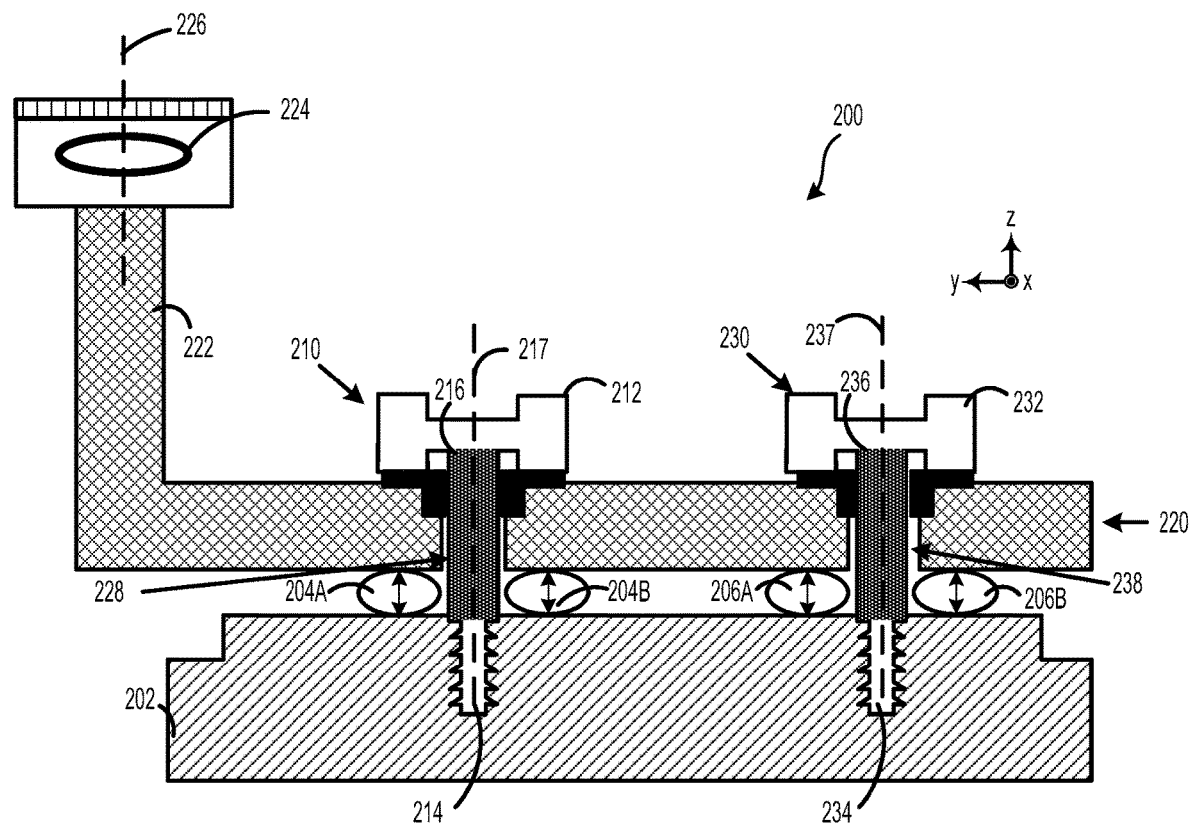
FIG. 2C illustrates another alternative arrangement of the system of FIG. 2A, according to an example embodiment.

FIG. 2C illustrates another alternative arrangement for the system 200 illustrated in FIG. 2A, according to an example embodiment. In particular, FIG. 2C illustrates an additional opening 238 in body 222 and an additional mechanical fastener 230. In some embodiments, opening 228 and opening 238 are each relatively the same size (e.g., within 1 mm of each other in size). In other embodiments, opening 228 and opening 238 are each exactly the same size. In yet other embodiments, opening 228 and opening 238 are each different sizes.

Like mechanical fastener 210, mechanical fastener 230 includes a first end 232, a second end 234, and a shaft 236 that connects the first end 232 to the second end 234. Second end 234 is coupled to the mounting surface 202. Shaft 236 extends through opening 238, thus further restricting movement of the camera device 220. Additionally, the primary axis 237 of shaft 236 is parallel to the primary axis 217 of shaft 216.

Figure 2D:
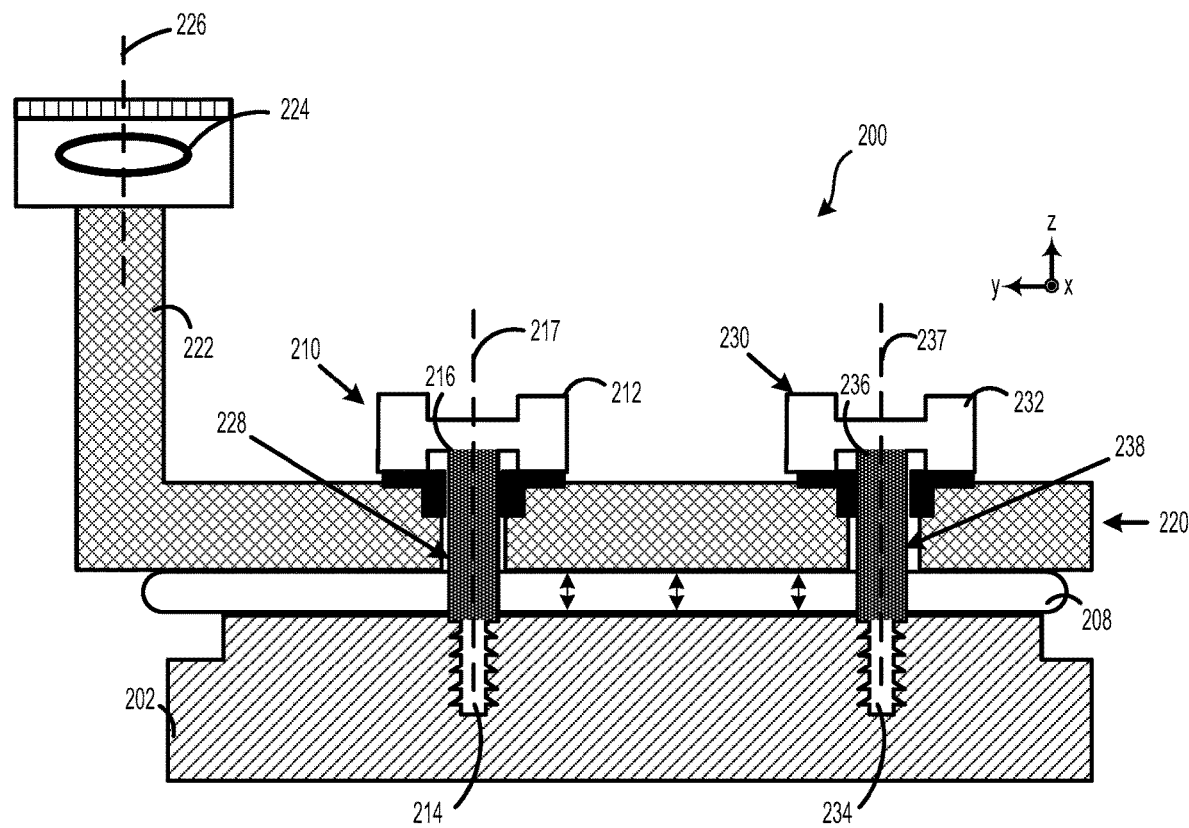
FIG. 2D illustrates an alternative arrangement of the system of FIG. 2C, according to an example embodiment.

FIG. 2D illustrates an alternative arrangement for the system 200 illustrated in FIG. 2C, according to an example embodiment. In particular, FIG. 2D illustrates a compliant structure 208 that acts as a single layer between body 222 and mounting structure 202. In such an arrangement, compliant structure 208 may contain apertures therethrough and both shaft 216 of mechanical fastener 210 and shaft 236 of mechanical fastener 230 could extend through those apertures in addition to extending through openings 228 and 238, respectively.

Figure 3A:
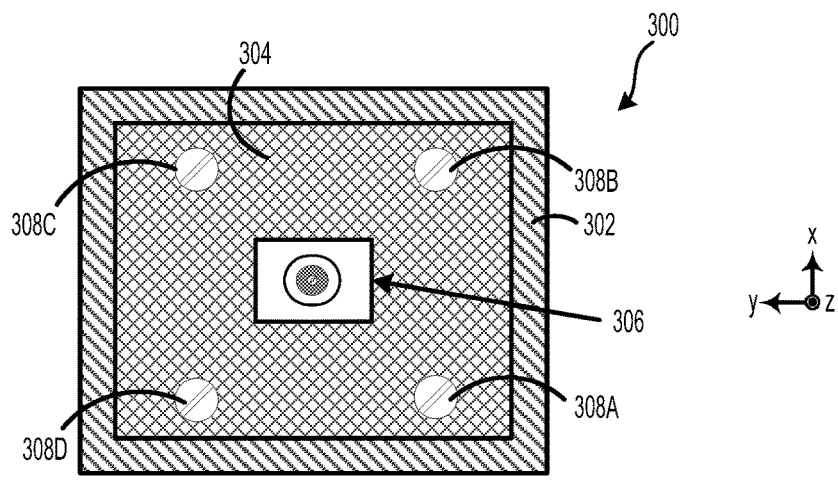
FIG. 3A illustrates an arrangement of mechanical fasteners, according to an example embodiment.

FIG. 3A illustrates a system 300, according to an example embodiment. The system 300 could include similar or identical elements as that of system 100 and/or system 200, as illustrated and described in reference to FIGS. 1 and 2. For example, system 300 includes a mounting surface 302 and a camera device 304 that includes an optical lens 306. The optical lens 306 could define an optical axis and a focal length for the camera device 304. In the example illustrated in FIG. 3A, the optical axis defined by the optical lens 306 is parallel to the z-axis.

The system 300 includes four mechanical fasteners: mechanical fastener 308A, mechanical fastener 308B, mechanical fastener 308C, and mechanical fastener 308D. The mechanical fasteners 308A, 308B, 308C, and 308D may couple the camera device 304 to the mounting surface 302. In some embodiments, mechanical fasteners 308A, 308B, 308C, and 308D are spaced uniformly across the body of the camera device 304. In other words, the distance between mechanical fastener 308A and mechanical fastener 308B may be the same as the distance between mechanical fastener 308A and mechanical fastener 308D, and the distance between mechanical fastener 308C and mechanical fastener 308D may be the same as the distance between mechanical fastener 308A and mechanical fastener 308D. In other embodiments, mechanical fasteners 308A, 308B, 308C, and 308D are each spaced at a same distance from the optical lens 306 of camera device 304. That is, the distance between mechanical fasteners 308A, 308B, 308C, and 308D and optical lens 306 may be same.

Figure 3B:
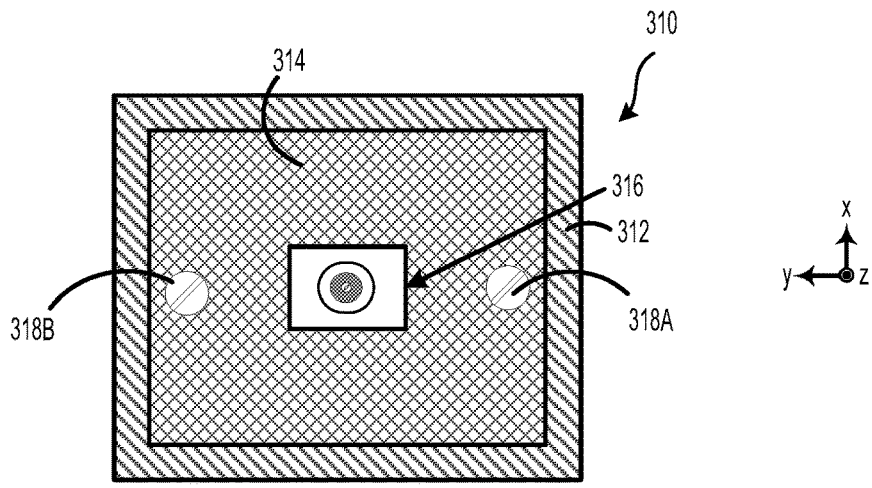
FIG. 3B illustrates an arrangement of mechanical fasteners, according to an example embodiment.

FIG. 3B illustrates a system 310, according to an example embodiment. Like system 300, system 310 could include similar or identical elements as that of system 100 and/or system 200, as illustrated and described in reference to FIGS. 1 and 2. For example, system 310 includes a mounting surface 312 and a camera device 314, which could incorporate optical lens 316. The optical lens 316 could define an optical axis and a focal length for the camera device 314. In the example illustrated in FIG. 3B, the optical axis defined by the optical lens 316 is parallel to the z-axis.

Unlike system 300, the system 310 includes two mechanical fasteners: mechanical fastener 318A and mechanical fastener 318B. The mechanical fasteners 318A and 318B may couple the camera device 314 to the mounting surface 312. In some embodiments, mechanical fasteners 318A and 318B are positioned along an axis perpendicular to the optical axis defined by the optical lens 316. For instance, FIG. 3B depicts mechanical fastener 318A and mechanical fastener 318B being positioned along the y-axis. In some embodiments, mechanical fasteners 318A and 318B are positioned equidistant from the position of optical lens 316. That is, the distance from mechanical fastener 318A to optical lens 316 may be the same as the distance from mechanical fastener 318B to optical lens 316.

Figure 3C:
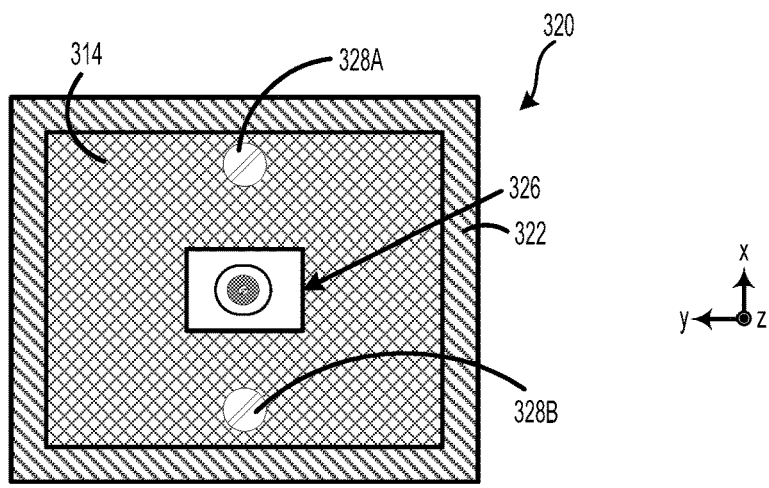
FIG. 3C illustrates an arrangement of mechanical fasteners, according to an example embodiment.
Figure 4A:
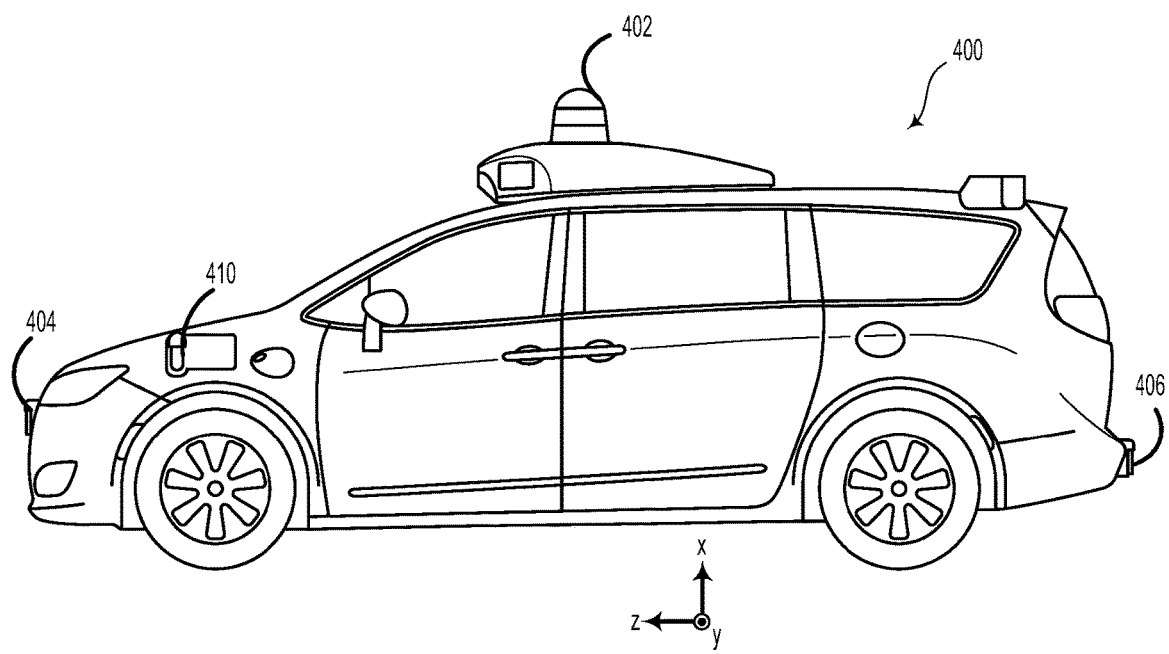
FIG. 4A illustrates a vehicle, according to an example embodiment.
Figure 4B:
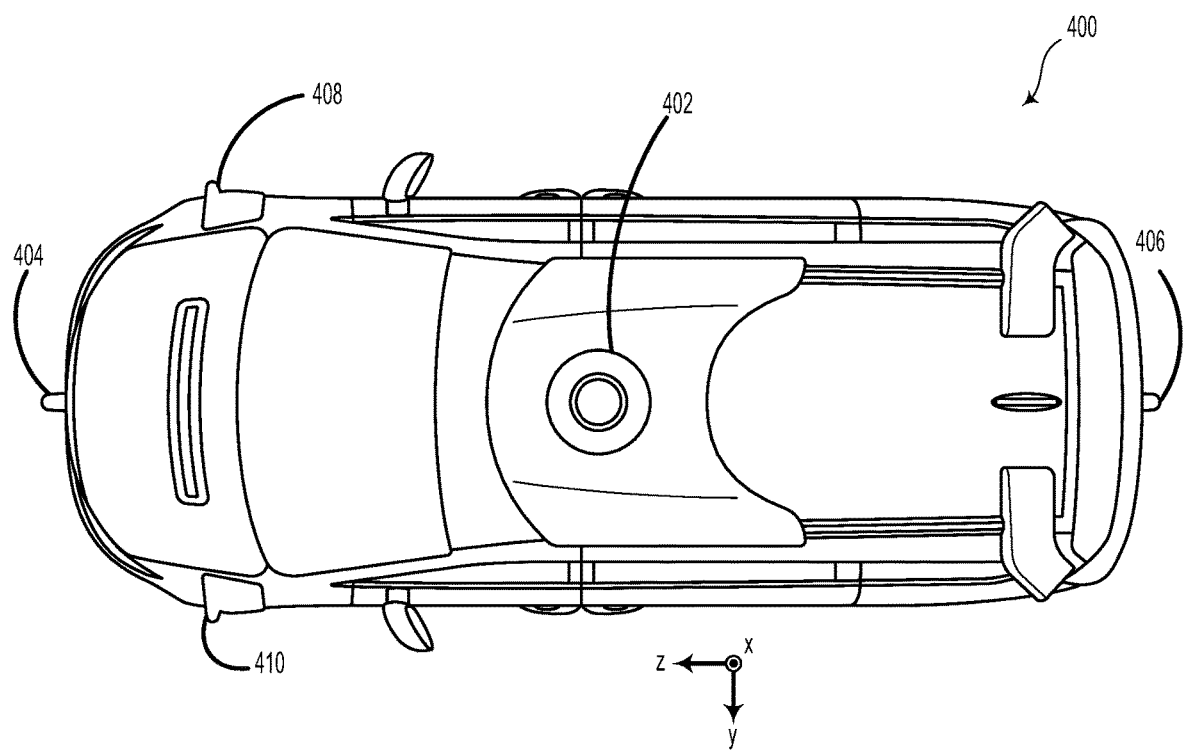
FIG. 4B illustrates a vehicle, according to an example embodiment.
Figure 4C:
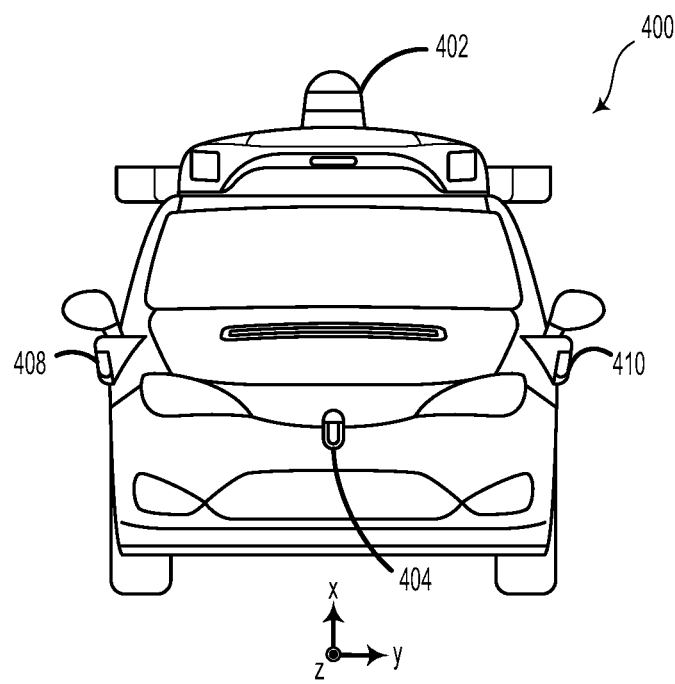
FIG. 4C illustrates a vehicle, according to an example embodiment.
Figure 4D:
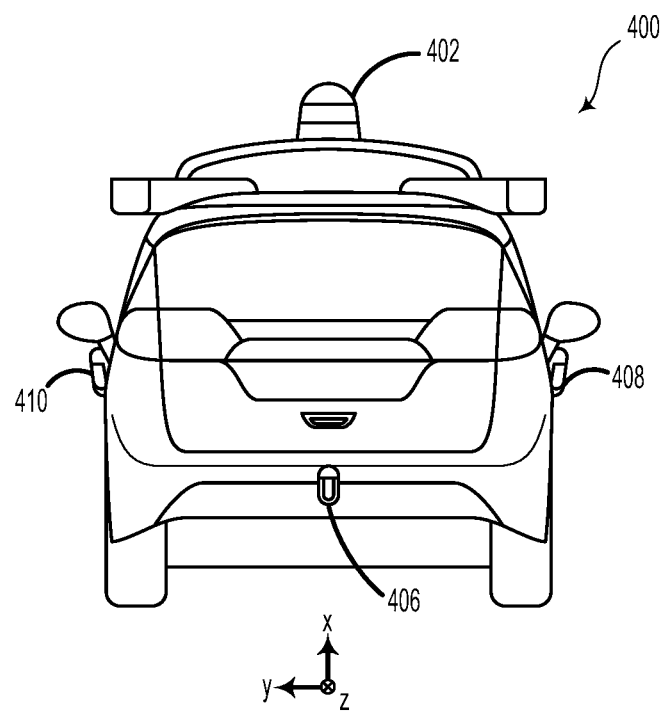
FIG. 4D illustrates a vehicle, according to an example embodiment.
Figure 4E:
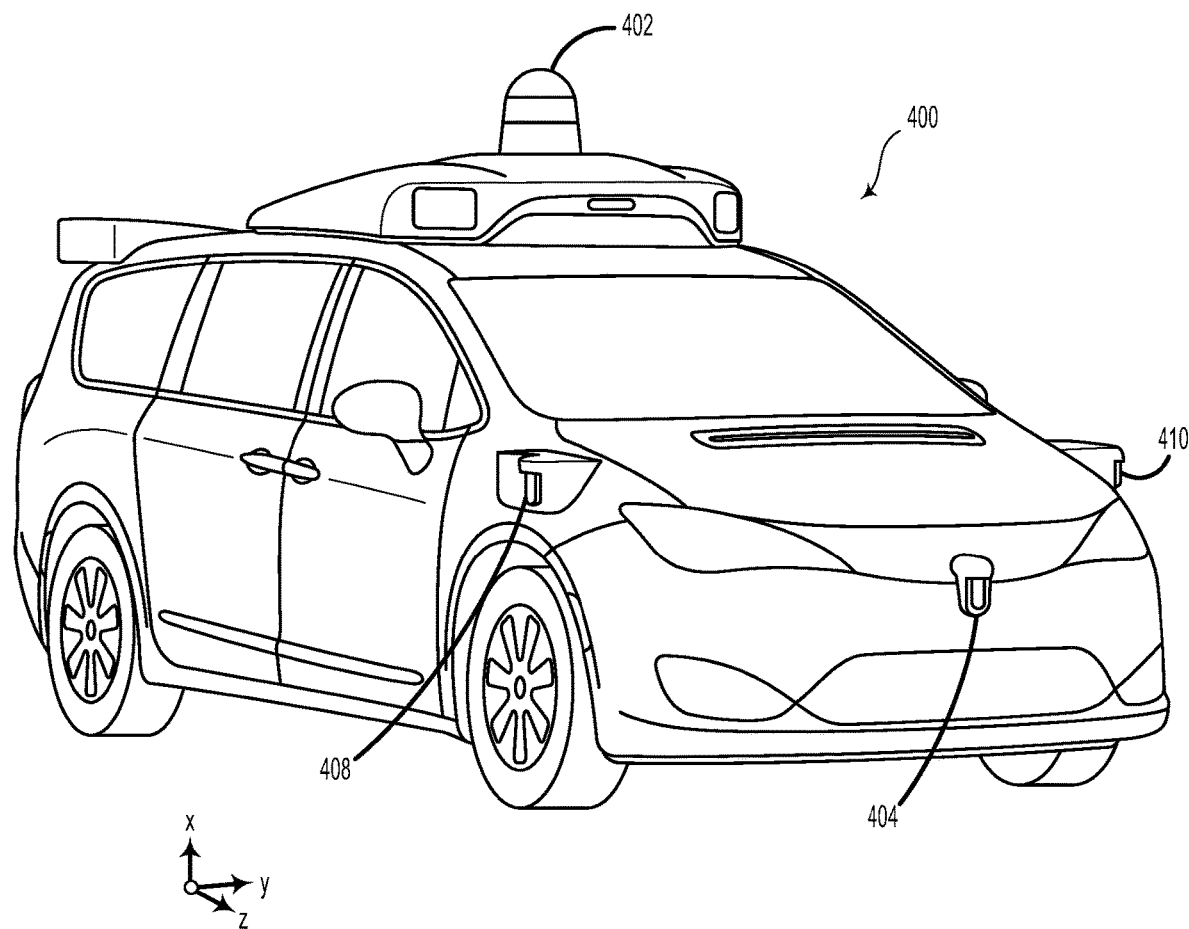
FIG. 4E illustrates a vehicle, according to an example embodiment.

FIG. 3C illustrates a system 320, according to an example embodiment. Like systems 300 and 310, system 320 could include similar or identical elements as that of system 100 and/or system 200, as illustrated and described in reference to FIGS. 1 and 2. For example, system 320 includes a mounting surface 322 and a camera device 324, which could incorporate optical lens 326. The optical lens 326 could define an optical axis and a focal length for the camera device 324. In the example illustrated in FIG. 3C, the optical axis defined by the optical lens 326 is parallel to the z-axis.

Unlike system 300, the system 320 includes two mechanical fasteners: mechanical fastener 328A and mechanical fastener 328B. The mechanical fasteners 328A and 328B may couple the camera device 324 to the mounting surface 322. In some embodiments, mechanical fasteners 328A and 328B are positioned along an axis perpendicular to the optical axis defined by optical lens 326. For example, FIG. 3C depicts mechanical fastener 328A and mechanical fastener 328B being positioned along the x-axis. In some embodiments, mechanical fasteners 328A and 328B are positioned equidistant from the position of optical lens 326. That is, the distance from mechanical fastener 328A to optical lens 326 may be the same as the distance from mechanical fastener 328B to optical lens 326.

Other examples are possible as well. For example, a camera device could be coupled to a mounting surface by way of three mechanical fasteners, five mechanical fasteners, or some other number of mechanical fasteners. In addition, the mechanical fasteners that couple the camera device to the mounting surface could all have the same configuration or could have different configurations (e.g., a camera device could be coupled to the mounting surface by way of two larger fasteners and two smaller fasteners).

III. Example Vehicles

FIGS. 4A-4E illustrate a vehicle 400, according to an example embodiment. The vehicle 400 could be a semi- or fully-autonomous vehicle. While FIGS. 4A-4E illustrates vehicle 400 as being an automobile (e.g., a minivan), it will be understood that vehicle 400 could include another type of autonomous vehicle, robot, or drone that can navigate within its environment using sensors and other information about its environment.

The vehicle 400 may include one or more sensor systems 402, 404, 406, 408, and 410. In example embodiments, the one or more of sensor systems 402, 404, 406, 408 could include RADAR devices, LIDAR devices, cameras (e.g., the camera device 110), or other sensors.

In an example embodiment, the LIDAR devices of sensor systems 402, 404, 406, 408, and 410 may be configured to rotate about an axis (e.g., the x-axis shown in FIGS. 4A-4E) so as to illuminate at least a portion of an environment around the vehicle 400 with light pulses and detect reflected light pulses. Based on the detection of reflected light pulses, information about the environment may be determined. The information determined from the reflected light pulses may be indicative of distances and directions to one or more objects in the environment around the vehicle 400. For example, the information may be used to generate point cloud information that relates to physical objects in the environment of the vehicle 400. The information could also be used to determine reflective properties of objects in the environment, the material composition of objects in the environment, or other information regarding the environment of the vehicle 400.

The information obtained from one or more of systems 402, 404, 406, 408, and 410 could be used to control the vehicle 400, such as when the vehicle 400 is operating in an autonomous or semi-autonomous mode. For example, the information could be used to determine a route (or adjust an existing route), speed, acceleration, vehicle orientation, braking maneuver, or other driving behavior or operation of the vehicle 400.

While FIGS. 4A-4E illustrate various sensor systems attached to the vehicle 400, it will be understood that the vehicle 400 could incorporate other types of systems, such as a plurality of systems 100, as described below.

Figure 5:
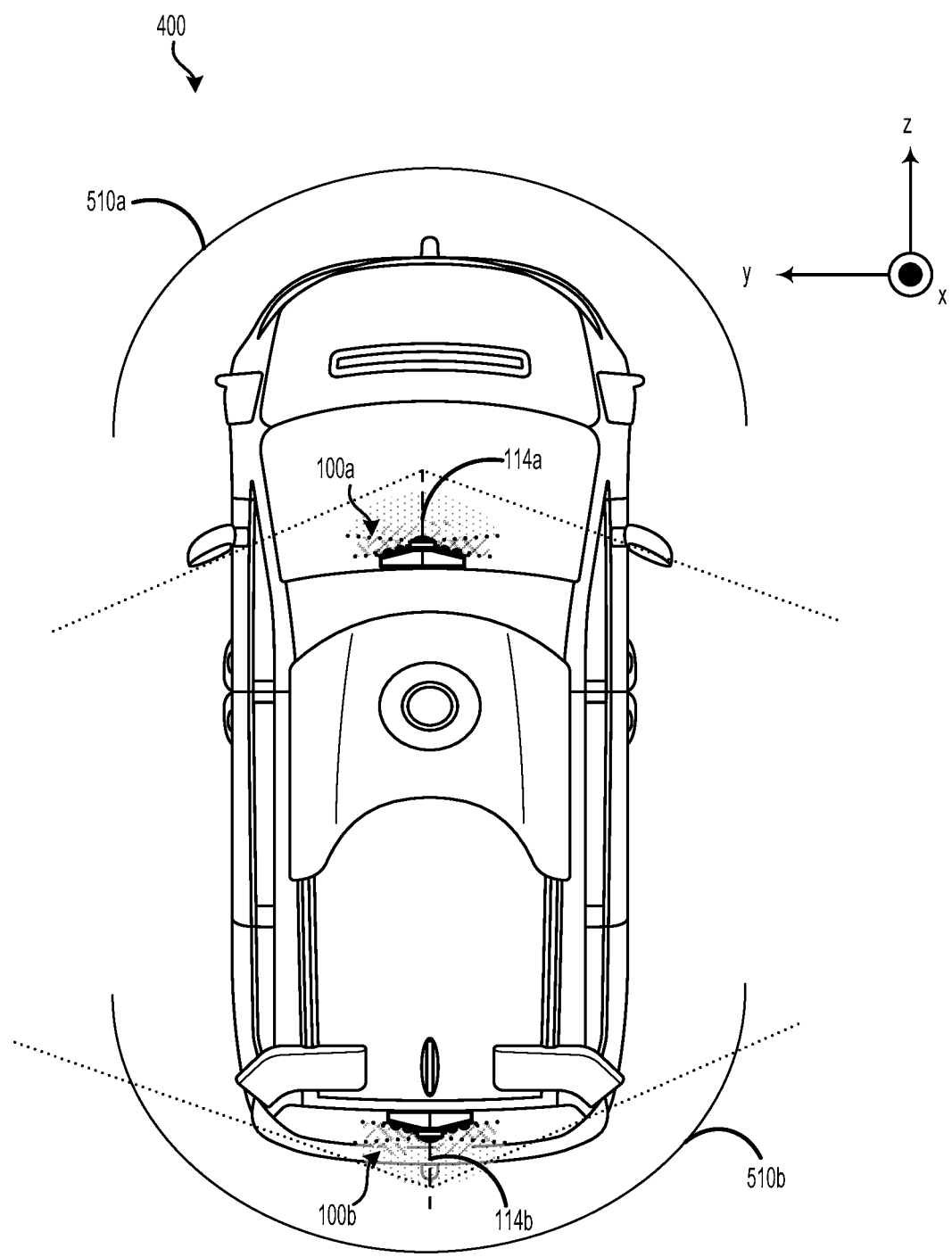
FIG. 5 illustrates the vehicle of FIG. 4A-E, according to an example embodiment.

FIG. 5 illustrates the vehicle 400 of FIGS. 4A-4E, according to an example embodiment. In some embodiments, the vehicle 400 could include one or more instances of system 100, 200, 300, 310, and/or 320, as illustrated and described in reference to FIGS. 1-3. As illustrated in FIG. 5, one or more systems described herein (e.g., systems 100*a* and 100*b*) could be coupled to the vehicle 400. In such examples, the system 100*a* could provide an optical axis 114*a* and a field of view 510*a*. Correspondingly, the optical system 100*b* could provide an optical axis 114*b* and a field of view 510*b*. While a relatively wide field of view (e.g., 190 degree cone) is illustrated herein, it will be understood that other cone angles are possible for optical systems 100*a* and 100*b*. Further, both optical axis 114*a* and 114*b* could be parallel to a primary plane of motion of the vehicle 400. In FIG. 5, the primary plane of motion of the vehicle 400 is shown to be along the z-y plane and thus parallel to the z-axis.

In some embodiments, systems 100*a* and 100*b* could include or be in communication with a controller, such as controller 160, having at least one processor and a memory. In such scenarios, the controller is configured to execute instructions stored in the memory so as to carry out operations. The operations could include causing the respective image sensors in systems 100*a* and 100*b* to capture images of at least a portion of an environment of the vehicle 400. For example, the operations could include capturing a plurality of images so as to provide information about the environment of the vehicle 400. In some embodiments, the images could be used to determine objects and/or obstacles within the environment.

IV. Example Methods of Assembly

Figure 6:
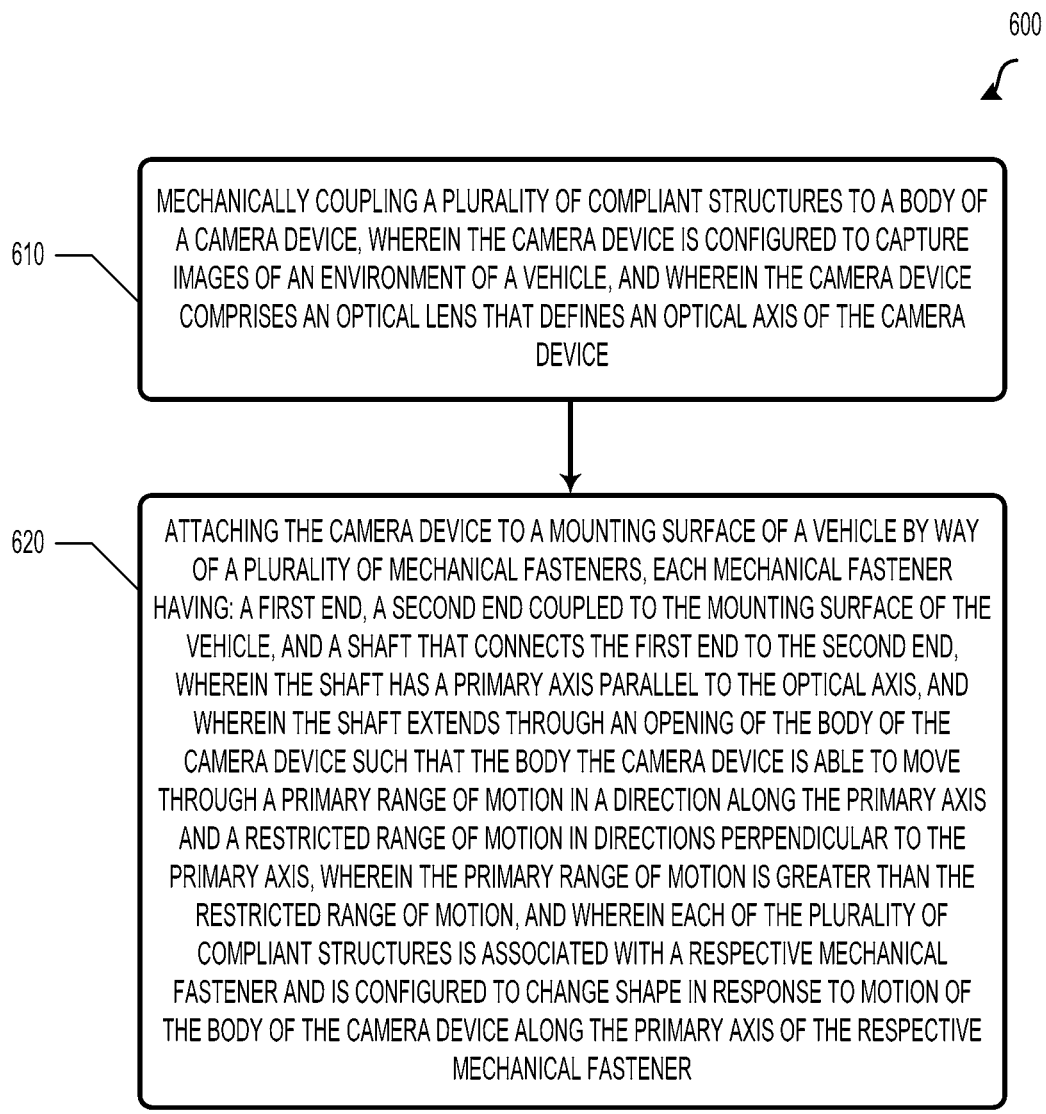
FIG. 6 illustrates a method, according to an example embodiment.
Figure 7A:
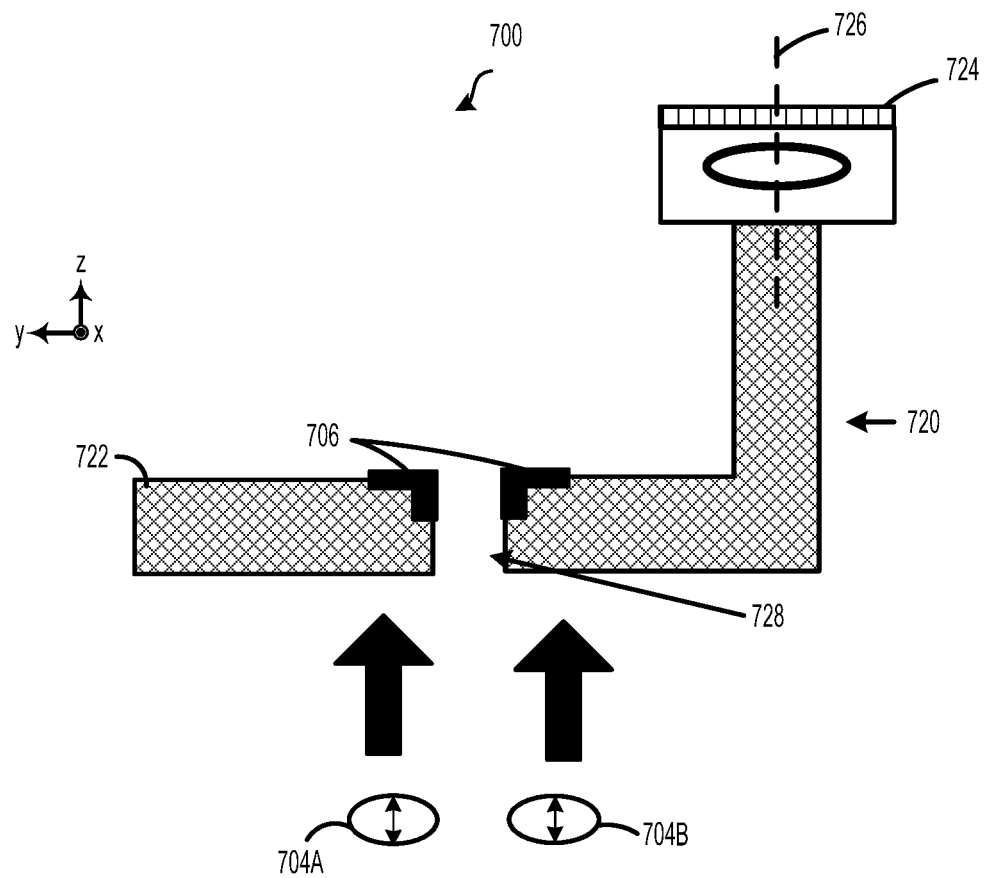
FIG. 7A illustrates a portion of the method of FIG. 6, according to an example embodiment.
Figure 7B:
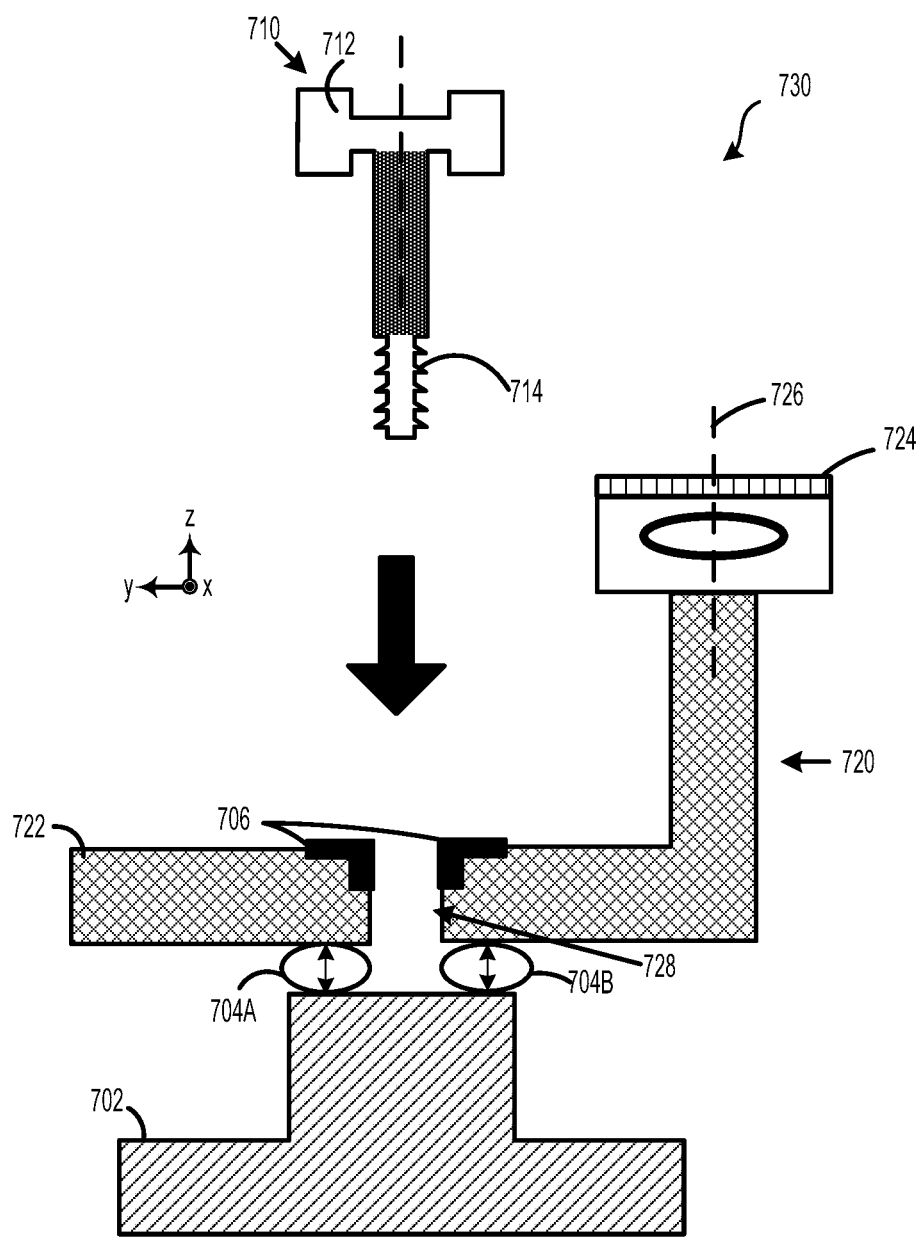
FIG. 7B illustrates a portion of the method of FIG. 6, according to an example embodiment.

FIG. 6 illustrates a method 600, according to an example embodiment. FIGS. 7A and 7B illustrate one or more blocks of the method 600 of FIG. 6, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may relate to elements of system 100, 200, 310, 320, and 330, as illustrated and described in reference to FIGS. 1, 2, 3A, 3B, and 3C.

Block 610 includes mechanically coupling a plurality of compliant structures to a body of a camera device. In the method, the camera device is configured to capture images of an environment of a vehicle and includes an optical lens that defines an optical axis of the camera device. In various examples, optical axis is parallel to a primary plane of motion of the vehicle. Further, in some examples, the plurality of compliant structures attenuate vibrations transferred from a mounting surface of the vehicle to the camera device, whereby vibrations experienced by the camera device have a lesser magnitude than vibrations experienced by the mounting surface of the vehicle.

In example embodiments, mechanically coupling the plurality of compliant structures includes positioning at least one compliant structure of the plurality of compliant structures between the body of the camera device and the mounting surface of the vehicle. In such embodiments, movement of the body of the camera device toward the mounting surface of the vehicle compresses the at least one compliant structure and movement of the body of the camera device away from the mounting surface of the vehicle decompresses the at least one compliant structure.

Alternatively, in some other example embodiments, mechanically coupling the plurality of compliant structures includes positioning at least one compliant structure of the plurality of compliant structures between the first end of at least one of the plurality of mechanical fasteners and the body of the camera device. In such alternative embodiments, movement of the body of the camera device away from the mounting surface of the vehicle compresses the at least one compliant structure and movement of the body of the camera device toward the mounting surface of the vehicle decompresses the at least one compliant structure.

In reference to FIG. 7A, scenario 700 illustrates the coupling of compliant structure 704A and compliant structure 704B to the body 722 of camera device 720. In an example embodiment, the body 722 could include opening 728 pre-drilled therethrough and a bushing that surrounds the opening 728 in body 722. In such an embodiment, compliant structures 704A and 704B could be initially coupled a location on the body 722 that is proximate (within 1 mm) to opening 728. Further, as shown in scenario 700, camera device 720 includes optical lens 724, which defines an optical axis 726 that is parallel to the z-axis.

Returning to FIG. 6, Block 620 includes attaching the camera device to a mounting surface of the vehicle by way of a plurality of mechanical fasteners, each mechanical fastener having: a first end, a second end coupled to the mounting surface of the vehicle, and a shaft that connects the first end to the second end. In the method, the shaft of each mechanical fastener has a primary axis parallel to the optical axis and the camera device, and extends through an opening of the body of the camera device such that the body of the camera device is able to move through a primary range of motion in a direction along the primary axis and a restricted range of motion in directions perpendicular to the primary axis, where the primary range of motion is greater than the restricted range of motion. Further, in the method, each of the plurality of compliant structures is associated with a respective mechanical fastener and is configured to change shape in response to motion of the body of the camera device along the primary axis of the respective mechanical fastener. In some embodiments, each compliant structure comprises an O-ring, a spring, or a Belleville washer.

In reference to FIG. 7B, scenario 720 illustrates attaching the camera device 720 to mounting surface 702 by way of mechanical fastener 710. In practice, when a force is exerted on mechanical fastener 710, the second end 714 of mechanical fastener 710 is inserted into mounting surface 702, thereby sealing the connection between the body 722 of the camera device 720 and mounting surface 702. In some embodiments, the force required to seal the connection is moderate, e.g., that applied by a laborer, for example by hand or with a manual tool. In other embodiments, the force required is large, e.g., hundreds of psi, and can be applied by a mechanically assisted system.

V. Example Operations

Figure 8:
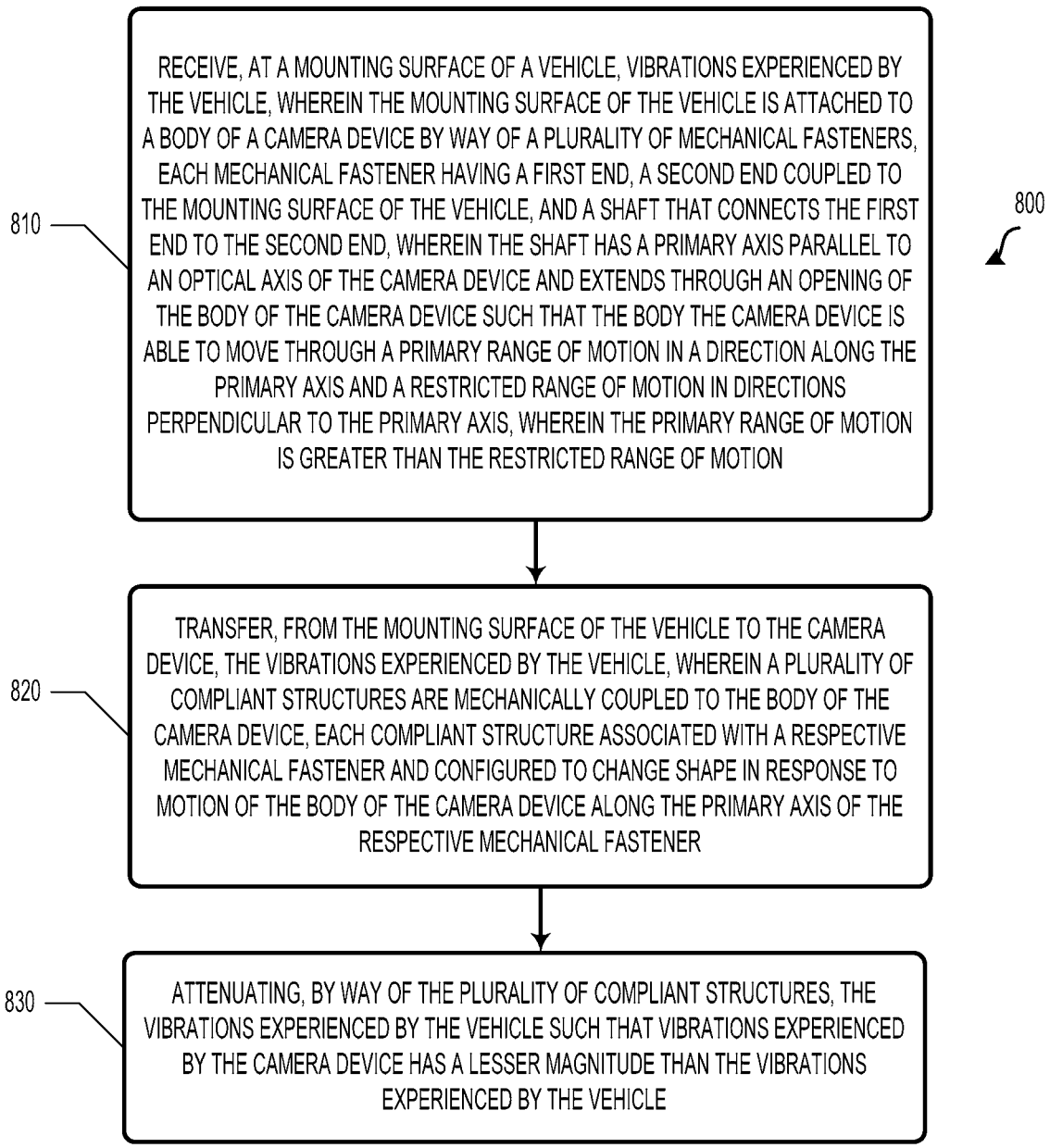
FIG. 8 illustrates a method, according to an example embodiment.
Figure 9A:
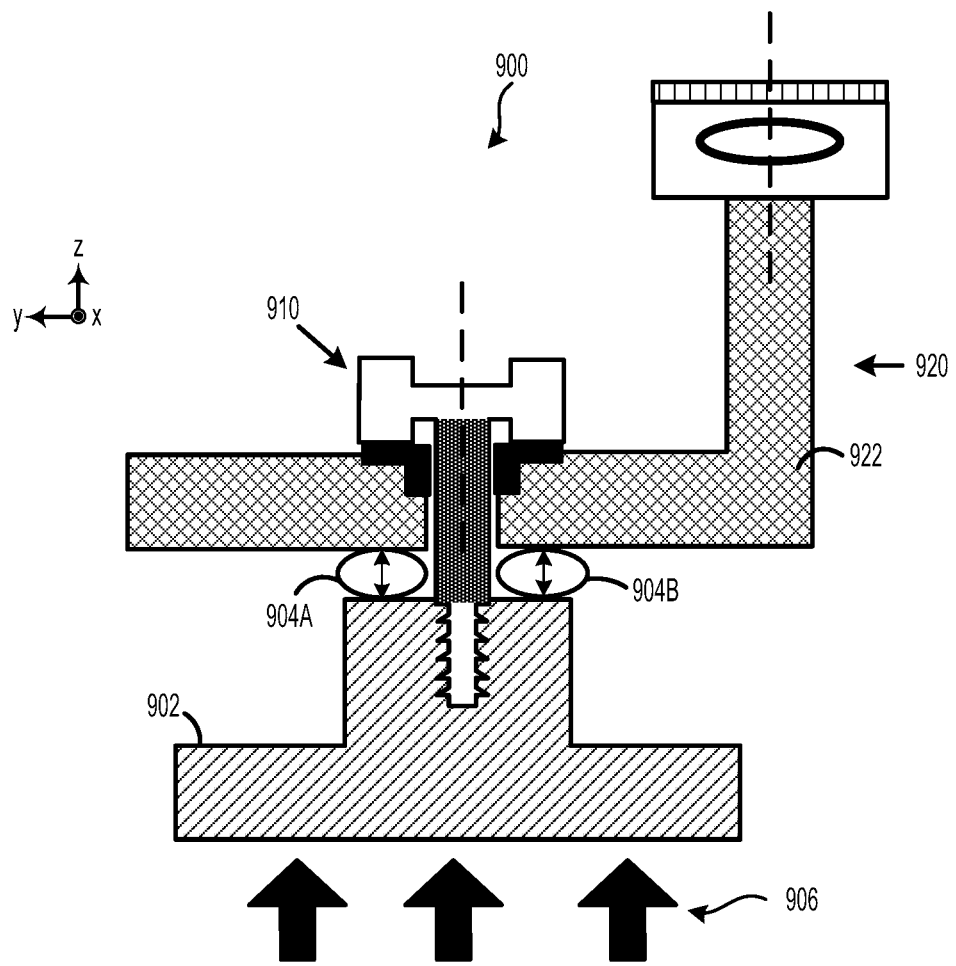
FIG. 9A illustrates a portion of the method of FIG. 8, according to an example embodiment.
Figure 9B:
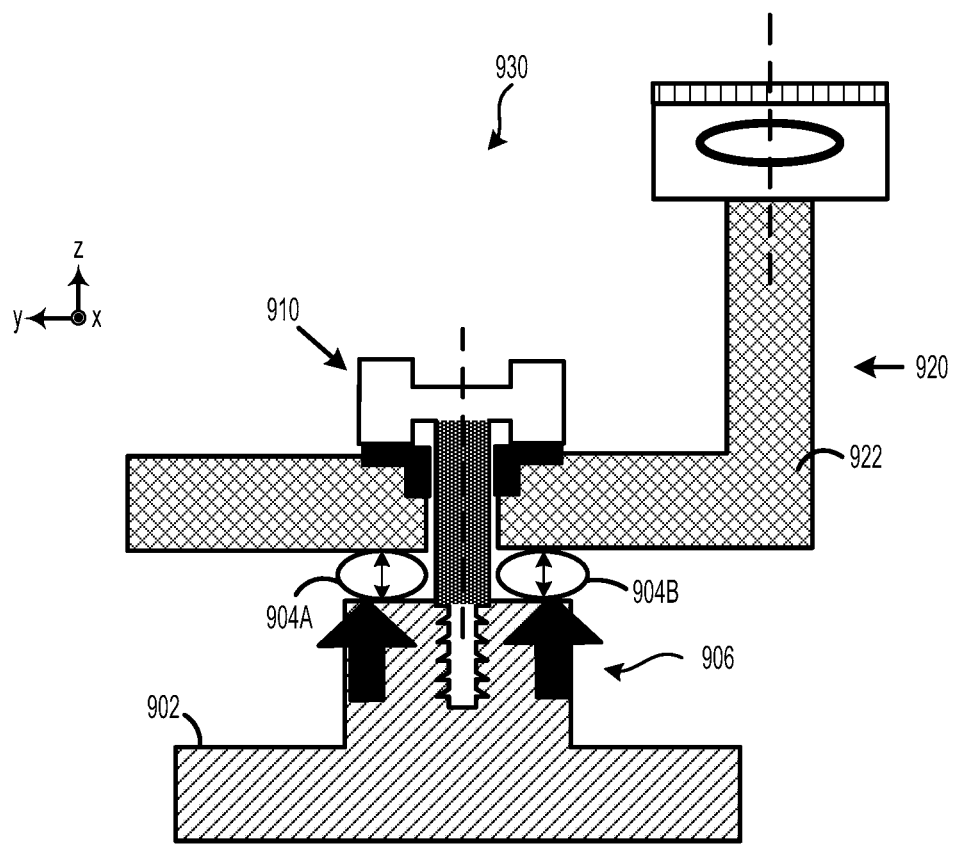
FIG. 9B illustrates a portion of the method of FIG. 8, according to an example embodiment.

FIG. 8 illustrates a method 800, according to an example embodiment. Method 800 may include various blocks or steps. FIGS. 9A and 9B illustrate one or more blocks of the method 800 of FIG. 8, according to an example embodiment. It will be understood that the method 800 may include fewer or more steps or blocks than those expressly illustrated or otherwise disclosed herein. Furthermore, respective steps or blocks of method 800 may be performed in any order and each step or block may be performed one or more times. Further, some or all blocks of method 800 may involve elements of system 100, 200, 310, 320, and 330, as illustrated and described in reference to FIGS. 1, 2, 3A, 3B, and 3C.

Block 810 includes receiving, at a mounting surface of a vehicle, vibrations experienced by the vehicle. In the method, the mounting surface of the vehicle may be attached to a body of a camera device by way of a plurality of mechanical fasteners. In example embodiments, each of the plurality of mechanical fasteners may have a first end, a second end coupled to the mounting surface of the vehicle, and a shaft that connects the first end to the second end. In some examples, the shaft for each mechanical fastener has a primary axis parallel to an optical axis of the camera device, and the shaft extends through an opening of the body of the camera device such that the body of the camera device is able to move through a primary range of motion in a direction along the primary axis and a restricted range of motion in directions perpendicular to the primary axis, where the primary range of motion is greater than the restricted range of motion.

In reference to FIG. 9A, scenario 900 illustrates receiving vibrations 906 at mounting surface 902. In scenario 900, mounting surface 902 may be associated with a particular vehicle. In some embodiments, vibrations 906 could result from the movement of the particular vehicle along a road or an external force, such as another vehicle, acting on the particular vehicle, among other possibilities.

Returning to FIG. 8, block 820 includes transferring, from the mounting surface of the vehicle to the camera device, the vibrations experienced by the vehicle. In the method, a plurality of compliant structures are mechanically coupled to the body of the camera device, each compliant structure associated with a respective mechanical fastener and configured to change shape in response to motion of the body of the camera device along the primary axis of the respective mechanical fastener. Then, at block 830, the method includes attenuating, by way of the plurality of compliant structures, the vibrations experienced by the vehicle such that vibrations experienced by the camera device have a lesser magnitude than the vibrations experienced by the vehicle.

In reference to FIG. 9B, scenario 930 illustrates mounting surface 902 mechanically transferring vibrations 906 to camera device 920 (e.g., via compliant structure 904A and compliant structure 904B). Upon receiving vibrations 906, the body 922 of camera device 920 could oscillate, causing compliant structures 904A and 904B to compress and decompress. Such compression and decompression by compliant structures 904A and 904B could attenuate vibration 906 so that vibrations experienced by camera device 920 are of lesser magnitude than those experienced by mounting surface 902.

In some embodiments, at least one compliant structure of the plurality of compliant structures is positioned between the body of the camera device and the mounting surface of the vehicle. For example, in reference to FIG. 9B, compliant structure 904A and compliant structure 904B are both positioned between body 922 and mounting surface 902. In other embodiments, at least one compliant structure of the plurality of compliant structures is positioned between the first end of at least one of the plurality of mechanical fasteners and the body of the camera device.

VI. Conclusion

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
a camera device configured to capture images of an environment of a vehicle, wherein the camera device comprises a body and an optical lens, wherein the optical lens defines an optical axis of the camera device;
a mounting surface of the vehicle;
a plurality of mechanical fasteners, each mechanical fastener having:
a first end,
a second end coupled to the mounting surface of the vehicle, and
a shaft that connects the first end to the second end, wherein the shaft has a primary axis parallel to the optical axis, and wherein the shaft extends through an opening of the body of the camera device such that the body of the camera device is able to move through a primary range of motion in a direction along the primary axis and a restricted range of motion in directions perpendicular to the primary axis, wherein the primary range of motion is greater than the restricted range of motion, and wherein a bushing surrounds the opening through which the shaft extends; and
a plurality of compliant structures positioned between the body of the camera device and the mounting surface of the vehicle, wherein each compliant structure comprises an O-ring, a spring, or a Belleville washer, and wherein each compliant structure is associated with a respective mechanical fastener and is configured to change shape in response to motion of the body of the camera device along the primary axis of the respective mechanical fastener.

2. The system of claim 1, wherein movement of the body of the camera device toward the mounting surface of the vehicle compresses the compliant structures and movement of the body of the camera device away from the mounting surface of the vehicle decompresses the compliant structures.

3. The system of claim 1, wherein the optical axis is parallel to a primary plane of motion of the vehicle.

4. The system of claim 1, wherein the plurality of compliant structures attenuate vibrations transferred from the mounting surface of the vehicle to the camera device, whereby vibrations experienced by the camera device have a lesser magnitude than vibrations experienced by the mounting surface of the vehicle.

5. A method for assembling a system, the method comprising:
positioning a plurality of compliant structures between a body of a camera device and a mounting surface of a vehicle, wherein each compliant structure comprises an O-ring, a spring, or a Belleville washer, wherein the camera device is configured to capture images of an environment of the vehicle, and wherein the camera device comprises an optical lens that defines an optical axis of the camera device; and
attaching the camera device to the mounting surface of the vehicle by way of a plurality of mechanical fasteners, each mechanical fastener having:
a first end,
a second end coupled to the mounting surface of the vehicle, and
a shaft that connects the first end to the second end, wherein the shaft has a primary axis parallel to the optical axis, and wherein the shaft extends through an opening of the body of the camera device such that the body of the camera device is able to move through a primary range of motion in a direction along the primary axis and a restricted range of motion in directions perpendicular to the primary axis, wherein the primary range of motion is greater than the restricted range of motion, wherein a bushing surrounds the opening through which the shaft extends, and wherein each of the plurality of compliant structures is associated with a respective mechanical fastener and is configured to change shape in response to motion of the body of the camera device along the primary axis of the respective mechanical fastener.

6. The method of claim 5, wherein movement of the body of the camera device toward the mounting surface of the vehicle compresses the compliant structures and movement of the body of the camera device away from the mounting surface of the vehicle decompresses the compliant structures.

7. The method of claim 5, wherein the optical axis is parallel to a primary plane of motion of the vehicle.

8. The method of claim 5, wherein the plurality of compliant structures attenuate vibrations transferred from the mounting surface of the vehicle to the camera device, whereby vibrations experienced by the camera device have a lesser magnitude than vibrations experienced by the mounting surface of the vehicle.

9. A method comprising:
receiving, at a mounting surface of a vehicle, vibrations experienced by the vehicle, wherein the mounting surface of the vehicle is attached to a body of a camera device by way of a plurality of mechanical fasteners, each mechanical fastener having:
a first end,
a second end coupled to the mounting surface of the vehicle, and
a shaft that connects the first end to the second end, wherein the shaft has a primary axis parallel to an optical axis of the camera device, and wherein the shaft extends through an opening of the body of the camera device such that the body of the camera device is able to move through a primary range of motion in a direction along the primary axis and a restricted range of motion in directions perpendicular to the primary axis, wherein the primary range of motion is greater than the restricted range of motion, and wherein a bushing surrounds the opening through which the shaft extends;
transferring, from the mounting surface of the vehicle to the camera device, the vibrations experienced by the vehicle, wherein a plurality of compliant structures are positioned between the body of the camera device and the mounting surface of the vehicle, wherein each compliant structure comprises an O-ring, a spring, or a Belleville washer, and wherein each compliant structure is associated with a respective mechanical fastener and configured to change shape in response to motion of the body of the camera device along the primary axis of the respective mechanical fastener; and
attenuating, by way of the plurality of compliant structures, the vibrations experienced by the vehicle such that vibrations experienced by the camera device has a lesser magnitude than the vibrations experienced by the vehicle.

* * * * *